Oct. 13, 1970   H. ZIEBOLZ ET AL   3,533,542
AUTOMATIC FLUIDIC WEB GUIDE SYSTEM
Filed Feb. 19, 1968   2 Sheets-Sheet 1

INVENTORS
Herbert Ziebolz
and
Eishiro Kushiro
BY Charles S. McGuire
ATTORNEY

United States Patent Office 3,533,542
Patented Oct. 13, 1970

3,533,542
AUTOMATIC FLUIDIC WEB GUIDE SYSTEM
Herbert Ziebolz, New York, N.Y., and Eishiro Kushiro, Tokyo, Japan, assignors to GPE Controls, Inc., Morton Grove, Ill., a corporation of Illinois
Filed Feb. 19, 1968, Ser. No. 706,249
Int. Cl. B65h 25/08
U.S. Cl. 226—22
6 Claims

ABSTRACT OF THE DISCLOSURE

A system for effecting automatic control of the lateral position of a moving web utilizing a fluidic element in the control loop in order to achieve certain advantages over conventional devices in this art.

---

This invention relates to automatic control of lateral alignment of a longitudinally travelling web of material. In many industrial applications it is desirable to supply materials in the form of elongated webs, and to transport such webs longitudinally during processing operations, for example. It is often important that the lateral alignment of the web be maintained within certain prescribed limits during longitudinal transport thereof. A common means of achieving lateral alignment of a moving web is one or more rotatable rolls frictionally contacted by the web surface during longitudinal transport, with means for moving the rolls as a function of web misalignment to bring the web back to the desired path.

Pneumatic sensors are one of a number of types used to derive a proportional output signal in accordance with the position of an edge of the web. The recovery nozzle of a pneumatic sensor may be connected to a pressure chamber enclosed on one side by a moveable diaphragm which converts the pressure within the chamber to a mechanical output. The moveable output member associated with the diaphragm is arranged to impart its movement to a hydraulic amplifier, for example, such as a conventional jet pipe regulator. Deflection of the fluid stream from the regulator is adapted to impart motion in either direction to a work cylinder which in turn is connected in a suitable manner to the guide rolls. Thus, the signal initially generated by the pneumatic sensor in response to deviations in the lateral position of the web, eventually results in a corrective action which restores the web to the desired path.

In the present invention, the signal developed by the pneumatic sensor is utilized to control the flow through a fluidic element which replaces the movable diaphragm in conventional systems, and may also replace the hydraulic amplifier. The invention is shown in a number of embodiments, all of which are characterized by a control loop having an appreciably higher gain than similar conventional systems, thereby providing a "tighter" control loop. That is, the higher loop gain achieved through the use of the fluidic element provides a resultant decrease in dynamic errors in the loop.

The object of the invention is to provide a web guide control system employing one or more pneumatic sensors and having considerably higher potential loop gain than in similar prior systems.

A further object is to provide a web guide control system including a fluidic element, responsive to signals from a pneumatic sensor, to effect control of web movement with a relatively high level signal output.

For a fuller understanding of the nature and objects of the invention reference should be had to the following detailed description taken in connection with the accompanying drawings, in which.

In general, control of the lateral position of a moving web has been either in accordance with the position of a single edge of the web, commonly known as "edge guiding," or in accordance with the lateral position of the web center line, usually known as "center guiding," in edge guiding, of course, it is necessary to sense the position of only one edge of the web since it is this parameter in accordance with which the entire web is to be guided. In center guiding, on the other hand, in order to develop a signal indicative of the web center line position, it is common to employ two sensors, one at each edge of the web, and subtracting the signals from the two to provide a difference signal indicating the center line position between the two edges. Although the prior art example and the various embodiments of the invention illustrated herein are shown in an edge guide application utilizing only a single sensor, it will be readily understood that the principles involved are equally applicable to center guide applications.

Figure 1:
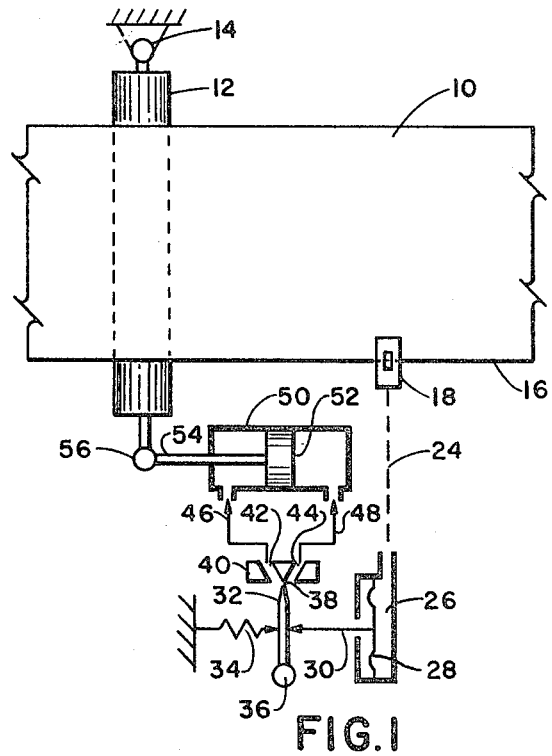
FIG. 1 is a somewhat diagrammatic plan view of a typical prior art web guide system employing a pneumatic sensor.

Referring now to the drawings, in FIG. 1 there is shown a fragment of an elongated web 10 arranged for longitudinal movement in contact with rotatably mounted guide roll 12. One end of guide roll 12 is mounted for movement about fixed pivot 14, and in so moving the guide roll will influence the lateral position of web 10. Although many mechanical arrangements are commonly used for moving guide rolls in a desired manner to effect control of the lateral movement of the web, the particular means forms no part of the present invention, and the form shown in FIG. 1 is used merely as a simple example.

Figure 1A:
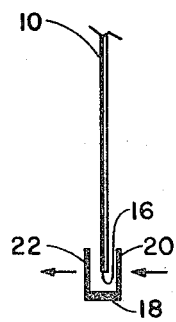
FIG. 1a is a side view of a portion of FIG. 1.

The lateral position of edge 16 of web 10 is sensed by stationary pneumatic sensor unit 18. As shown more clearly in FIG. 1a, edge 16 passes between supply nozzle 20 and recovery nozzle 22 of sensor 18. An air stream passing through nozzle 20 is partially intercepted by web 10 in accordance with the position of edge 16 thereof. Thus, the magnitude of the signal developed by recovery nozzle 22 is dependent upon the extent to which the air supply is intercepted by the web.

Dotted line 24 indicates a connection between recovery nozzle 22 of sensor 18 and pressure chamber 26 which is inclosed on one side by movable diaphragm 28. Output rod 30 is rigidly connected to diaphragm 28 and is arranged to transmit motion to jet pipe 32 in opposition to spring 34. Jet pipe 32 is mounted for pivotal movement about the axis of hollow tube 36 through which a hydraulic fluid is supplied under relatively high pressure for ejection through nozzle 38 of jet pipe 32. The hydraulic fluid from nozzle 38 is directed toward distributor block 40 and may impinge more or less upon either of ports 42 and 44 as jet pipe 32 is moved about its pivotal mounting through the action of rod 30 and spring 34. The fluid is conducted through lines 46 and 48 to opposite ends of cylinder 50 to effect movement of piston 52 therein. Rod 54 extends from cylinder 50 to a pivotal connection at 56 with the end of guide roll 12 opposite the latter's pivotal mounting at 14. Thus, a pressure signal generated by an air stream across sensor 18 in accordance with the lateral position of edge 16 causes movement of diaphragm 28 and rod 30. This causes pivoting movement of jet pipe 32 resulting in the high pressure hydraulic fluid being directed more toward one end of cylinder 50 than the other, thereby moving piston 52 and guide roll 12, the latter influencing lateral movement of web 10.

Figure 2:
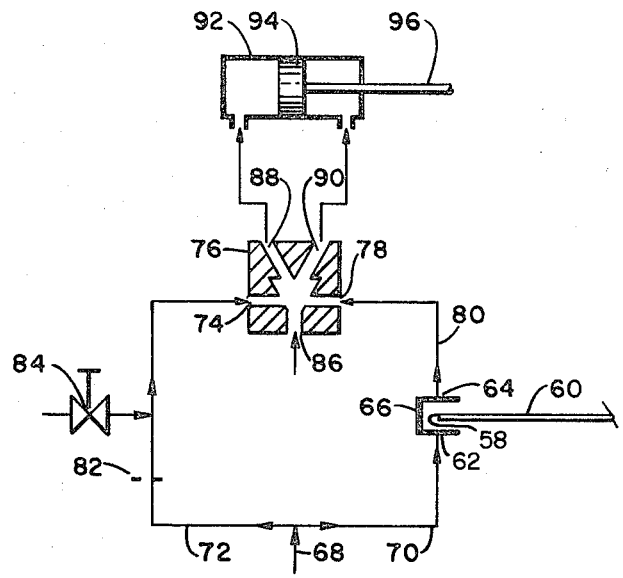
FIG. 2 is a simplified, partly diagrammatic view of a first embodiment of a present invention.

Turning now to FIG. 2, the present invention is illustrated diagrammatically in one of its most basic embodiments. Edge 58 of web 60 passes between supply or pressure nozzle 62 and recovery nozzle 64 of pneumatic sensor 66. An air supply through line 68 passes partly through line 70 to pressure nozzle 62 and partly through line 72 to a first inlet 74 of fluidic element 76. A second inlet 78 of fluidic element 76 is connected by line 80 to recovery nozzle 64 of pneumatic sensor 66. Line 72 may contain such pressure adjusting means as orifice 82 and valve 84 to set the pressure at inlet 74 at a desired point. Since a large portion of the air flowing out of pressure nozzle 62 is lost before reaching recovery nozzle 64, especially since a portion of this air is totally intercepted by web 60, the pressure signal developed at inlet 78 may be expected to be quite low in level. This is typically true of proportional type pneumatic sensors wherein signal magnitude is sacrificed in order to provide a simple and economical, non-contacting sensor unit. According to the prior art, as in FIG. 1, this low level pneumatic signal was converted to a low level mechanical output which was best utilized in conjunction with a device such as a jet pipe regulator since the latter is especially well adapted to operate with a low level input. As pointed out earlier herein, however, this was done at the expense of loop gain and with other obvious disadvantages connected with the conversion of the pressure signal to a mechanical output of the diaphragm.

According to the present invention, the advantages of utilizing a pneumatic signal (e.g. the absence of moving parts) are retained while providing a signal which may be, for example, an entire order of magnitude greater than that available from the pneumatic sensor alone. Fluidic element 76 receives an air supply under suitable pressure through orifice 86. If undisturbed, this air supply will pass out of fluidic element 76 equally through outlets 88 and 90. The outlets are connected through appropriate lines to opposite ends of cylinder 92, having piston 94 and output rod 96. The pressure at first inlet 74 is adjusted by means of orifice 82 and valve 84 to be equal to the pressure at second inlet 78 when edge 58 of web 60 intersects substantially half of the air stream passing from pressure nozzle 62 to recovery nozzle 64. If edge 58 tends to move out of the air stream from pressure nozzle 62 a greater amount of air will reach recovery nozzle 64 with a resultant increase in pressure at inlet 78. Since the pressure at inlet 78 is then higher than that at inlet 74, the air stream entering through orifice 86 will be deflected more toward outlet 88 than toward outlet 90. This will obviously result in movement of piston 94 toward the right as viewed in FIG. 2. Rod 96 is connected through any appropriate mechanical linkage to the guide roll mechanism which influences lateral movement of web 60. The arrangement of this linkage is such that movement of piston 94 and rod 96 toward the right results in lateral movement of web 60 toward the left, as viewed in FIG. 2. Thus, the control loop will automatically serve to reposition web 60 with edge 58 substantially midway across the air stream from power nozzle 62.

Figure 3:
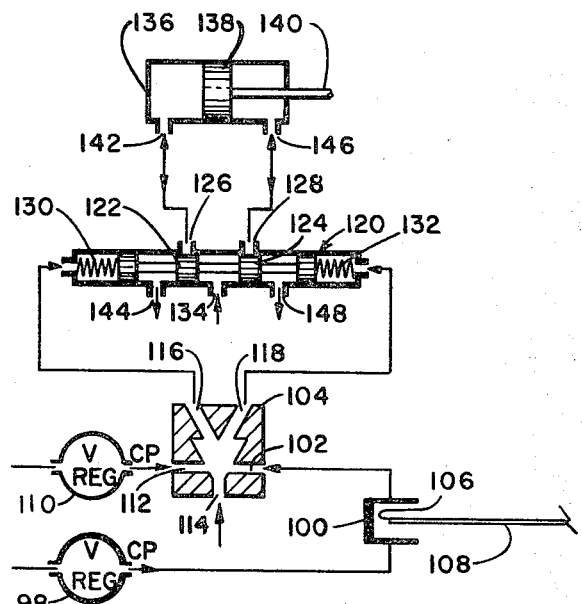
FIGS. 3 and 4 are similar views of additional embodiments of the invention.

FIG. 3 illustrates another embodiment of the invention wherein an amplifying element in the form of a pilot or spool valve, or the like, is interposed between the fluidic element and the work cylinder. Air is supplied from an appropriate source through constant pressure regulating valve 98 to pneumatic sensor 100 to provide a signal at inlet 102 of fluidic element 104 in accordance with the position of edge 106 of web 108, as in the previous embodiments. Valve 110 serves to provide an air flow at constant pressure at inlet 112 of the fluidic element, in opposition to the signal air pressure through inlet 102. An air supply is also provided through inlet 114, to be acted on by the opposing air streams through 102 and 112, and passes through outlets 116 and 118 to opposite ends of spool valve 120.

Spool valve 120 may be thought of as providing a secondary stage amplifier, the first stage being provided by fluidic element 104, in the FIG. 3 embodiment. Spools 122 and 124 act as closure elements for openings 126 and 128, respectively, in the valve body when the elements are in the illustrated position. Springs 130 and 132 provide a biasing force tending to maintain the moveable portion of the valve in the central position in the absence of a differential force from fluidic element 104. When the pressure at inlet 102 is either higher or lower than that at inlet 112, the fluid stream through fluidic element 104 will be deflected more toward one end of valve 120 than the other. The differential force thus created will serve to move the spool element to uncover openings 126 and 128. A fluid under relatively high pressure, for example a hydraulic fluid, is supplied to spool valve 120 through inlet 134. With the spool element in the central position shown in FIG. 3 the fluid cannot flow through valve 120, but movement of the spool element toward the right, for example, permits the fluid to flow through inlet 134 and outlet 128 to the right end of cylinder 136. This results in movement of piston 138 and rod 140 toward the left as viewed in FIG. 3 with a resulting corrective action in the lateral position of web 108, as explained in connection with previous examples. As piston 138 moves toward the left, fluid may be expelled from cylinder 136 through opening 142, and through openings 126 and 144 in valve 120 since spool 122 has been moved to the right along with the other spool elements of valve 120. Movement of the spool element of valve 120 toward the left, due to an opposite differential force from fluidic element 104, results in fluid flow and piston movement in the opposite direction with fluid entering the cylinder through opening 142 and being expelled through opening 146 and openings 128 and 148 in valve 120. It will be noted that control is entirely proportional since the air stream through fluidic elements 104 may be deflected to any degree in dependence on the difference in pressures at inlets 102 and 112. Consequently, the spool element of valve 120 may be moved to uncover either of openings 126 and 128 to any degree from fully closed to fully opened.

Figure 4:
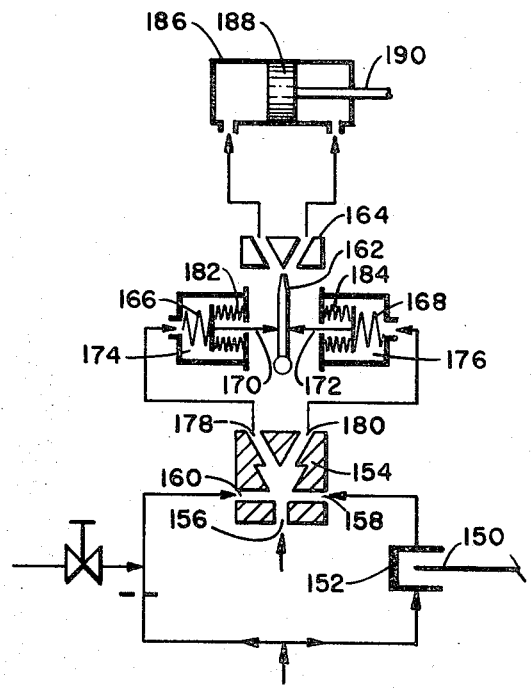

Turning now to the embodiment of FIG. 4, the invention is shown in combination with a jet pipe regulator which effects control of cylinder movement in the manner of the embodiment of FIG. 1 with the notable difference that the present embodiment allows a control loop with much higher gain. Again, an edge of web 150 is sensed by pneumatic sensor 152 to provide a signal to fluidic element 154. The air supply through inlet 156 is acted upon by the signal air pressure at inlet 158 and the opposing constant pressure through inlet 160. Jet pipe 162 is mounted for pivotal movement in the usual manner to direct a stream of high pressure fluid toward distributor block 164. Jet pipe 162 is normally maintained in a central position by springs 166 and 168, the biasing forces of which are transmitted to the jet pipe by rigid rods 170 and 172, respectively. The use of springs 166 and 168 provides a much tighter or "stiffer" system, providing the aforementioned high loop gain, and is made possible by the higher level signal available from fluidic element 154 as opposed to sensor 152 alone. The rods are movable in response to differential pressures generated between chambers 174 and 176 which are connected, respectively, to outlets 178 and 180 of fluidic element 154. Flexible bellows 182 and 184 may be utilized to transmit motion to rods 170 and 172 while maintaining chambers 174 and 176 in a sealed condition. Fluid from jet pipe 162 is directed to opposite ends of cylinder 186, to produce movement of piston 188 and rod 190 in accordance with the direction and magnitude of deflection of the jet pipe. Rod 190 is connected to appropriate mechanism to produce a desired correction in the position of web 150, as explained in connection with previous embodiments.

From the foregoing description, it may be seen that the invention provides a control loop utilizing a relatively high level, proportional pneumatic signal. Although the use of pneumatic sensors is often desirable in web guide application, such devices and the diaphragm elements utilized to produce a mechanical output therefrom are capable of producing only a low level signal. The use of a fluidic element in the manner indicated herein, with a constant pressure air flow directed in opposition to the variable signal received from the sensing nozzle of the pneumatic sensor, provides a proportional output pneumatic signal of much higher level. Thus, a control loop with much higher gain and consequent reductions in dynamic errors present in the loop may be achieved through the present invention.

The embodiments of the invention in which an exclusive property or privilege is claimed are defined as follows:

1. An automatic web guide system for controlling he action of guide roll means to provide lateral positioning of a moving web, said system comprising, in combination:
   (a) pneumatic sensor means for generating a continuously variable pressure signal in accordance with the lateral position of at least one edge of said web;
   (b) a proportional output fluidic device including a pair of output lines for a fluid stream passing through said device, a first passageway for flow of said fluid stream from a supply inlet to said pair of output lines in equal proportions so long as said fluid stream is undisturbed, a second passageway so connecting with said first passageway that the magnitude of said pressure signal operates through said second passageway to deflect said fluid stream, and a third passageway so connecting with said first passageway that a predetermined, constant fluid pressure at said third passageway acts on said fluid stream in opposition to said pressure signal to direct said fluid stream in equal proportions to said output lines when said pressure signal is at a predetermined magnitude;
   (c) means so connecting said pneumatic sensor means with said fluidic device that the proportions of said fluid stream directed toward each of said output lines is a function of the magnitude of said pressure signal;
   (d) movable means arranged for movement in one direction in response to a larger proportion of said fluid stream being directed toward one of said output lines, and in the opposite direction in response to a larger proportion of said fluid stream being directed toward the other of said output lines; and
   (e) means for effecting lateral movement of said web in the appropriate direction in response to movement of said movable means.

2. The invention according to claim 1 wherein a common air supply is connected to both said pressure nozzle and said third passageway with pressure reducing means interposed in the line between said air supply and said third passageway.

3. The invention according to claim 1 wherein said movable means comprises a secondary fluid amplifier.

4. The invention according to claim 3 wherein said fluid amplifier comprises a pilot valve controlling the flow of pressurized fluid to a work cylinder.

5. The invention according to claim 3 wherein said fluid amplifier comprises a jet pipe regulator controlling movement of a work cylinder.

6. The invention according to claim 5 wherein a relatively strong spring bias is provided on each side of the movable jet pipe of said regulator tending to maintain said jet pipe in a central position against the differential action of said fluid stream, thereby providing a higher loop gain in said web guide system.

References Cited

UNITED STATES PATENTS

| | | | |
|---|---|---|---|
| 2,871,013 | 1/1959 | Markey | 226—22 X |
| 2,941,572 | 6/1960 | Densen et al. | 226—22 X |
| 3,071,157 | 1/1963 | Robertson et al. | 226—22 X |
| 3,135,291 | 6/1964 | Kepler et al. | |
| 3,175,813 | 3/1965 | Costakis | 226—22 X |
| 3,239,150 | 3/1966 | Chisel. | |
| 3,317,101 | 5/1967 | Himrod et al. | 226—22 X |

ALLEN N. KNOWLES, Primary Examiner

U.S. Cl. X.R.

137—81.5